US011959618B2

(12) United States Patent
Lasick et al.

(10) Patent No.: US 11,959,618 B2
(45) Date of Patent: Apr. 16, 2024

(54) SOLAR POWERED LAMP ATTACHMENT ASSEMBLY

(71) Applicants: Matt Lasick, Freeland, WA (US); Kathryn Lasick, Freeland, WA (US)

(72) Inventors: Matt Lasick, Freeland, WA (US); Kathryn Lasick, Freeland, WA (US)

( * ) Notice: Subject to any disclaimer, the term of this patent is extended or adjusted under 35 U.S.C. 154(b) by 69 days.

(21) Appl. No.: 17/843,375

(22) Filed: Jun. 17, 2022

(65) Prior Publication Data

US 2023/0408052 A1 Dec. 21, 2023

(51) Int. Cl.

| | |
|---|---|
| ***F21S 9/03*** | (2006.01) |
| ***F21K 9/23*** | (2016.01) |
| ***F21K 9/232*** | (2016.01) |
| ***F21K 9/233*** | (2016.01) |
| ***F21K 9/235*** | (2016.01) |
| ***F21K 9/237*** | (2016.01) |
| ***F21K 9/238*** | (2016.01) |
| ***F21V 1/06*** | (2006.01) |
| ***F21V 17/06*** | (2006.01) |
| ***F21V 19/00*** | (2006.01) |
| ***F21V 23/04*** | (2006.01) |
| ***F21W 131/10*** | (2006.01) |

(52) U.S. Cl.

CPC ................ *F21S 9/037* (2013.01); *F21V 1/06* (2013.01); *F21V 17/06* (2013.01); *F21V 23/0421* (2013.01); *F21K 9/23* (2016.08); *F21K 9/232* (2016.08); *F21K 9/233* (2016.08); *F21K 9/235* (2016.08); *F21K 9/237* (2016.08); *F21K 9/238* (2016.08); *F21S 9/03* (2013.01); *F21S 9/032* (2013.01); *F21S 9/035* (2013.01); *F21V 19/006* (2013.01); *F21V 19/0065* (2013.01); *F21V 23/04* (2013.01); *F21W 2131/10* (2013.01)

(58) Field of Classification Search

CPC .... F21S 9/03; F21S 9/032; F21S 9/035; F21S 9/037; F21V 19/006; F21V 19/0065; F21V 23/04; F21K 9/23; F21K 9/232; F21K 9/233; F21K 9/235; F21K 9/237; F21K 9/238

See application file for complete search history.

(56) References Cited

U.S. PATENT DOCUMENTS

| | | | |
|---|---|---|---|
| 9,197,033 | B1 | 11/2015 | Tsai |
| 10,451,233 | B1 | 10/2019 | Izradel |
| D900,371 | S | 10/2020 | Zhong |

(Continued)

FOREIGN PATENT DOCUMENTS

| | | |
|---|---|---|
| GB | 2551658 | 4/2017 |

*Primary Examiner* — Colin J Cattanach

(57) ABSTRACT

A solar powered lamp attachment assembly for reducing energy consumption includes a base having an inner wall with a bottom end attached to a socket. The socket inserts into a porcelain lamp holder. An outer wall has an outer surface and a top surface. A plurality of lights is positioned on the top surface of the outer wall. A level switch on the outer surface includes a low button, a high button and a mid button. A solar panel is provides power to the plurality of lights. Additionally, a main switch is positioned on the outer surface of the outer wall of the base. The main switch includes a night button to enable a photoelectric cell, an actuator button to close or open electric power from the solar panel to the plurality of lights, and a plus button to enable a plurality of extra lights.

19 Claims, 6 Drawing Sheets

(56) References Cited

U.S. PATENT DOCUMENTS

| | | | | |
|---|---|---|---|---|
| 10,816,151 | B2 | 10/2020 | Glennerster | |
| 11,015,772 | B1 | 5/2021 | De Souza | |
| 11,131,435 | B2 | 9/2021 | Benninghoff | |
| 2002/0075676 | A1 * | 6/2002 | Jones | F21V 23/0442 362/802 |
| 2006/0034077 | A1 * | 2/2006 | Chang | F21V 3/02 362/800 |
| 2012/0091900 | A1 | 4/2012 | Foiurnier | |
| 2012/0327660 | A1 * | 12/2012 | Lin | F21K 9/232 362/253 |
| 2014/0049963 | A1 * | 2/2014 | McGuire | F21K 9/232 362/382 |
| 2018/0135819 | A1 * | 5/2018 | Grandadam | F21V 21/02 |
| 2018/0288847 | A1 * | 10/2018 | Halliwell | H05B 45/10 |
| 2021/0274619 | A1 | 9/2021 | Bailey | |

* cited by examiner

SOLAR POWERED LAMP ATTACHMENT ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to solar powered lamp devices and more particularly pertains to a new solar powered lamp device for reducing energy consumption.

(2) Description of Related Art Including Information Disclosed Under 37 CFR 1.97 and 1.98

The prior art relates to solar powered lamp devices. The prior art includes a variety of solar powered lamp devices configured to provide outdoor illumination and replace electric lamps. Known prior art lacks a solar power lamp device configured for providing outdoor illumination at night by a photocell sensor and being able to receive power from a standard electric supply as well.

BRIEF SUMMARY OF THE INVENTION

An embodiment of the disclosure meets the needs presented above by generally comprising a base. The base has a cylindrical shape. The base has an inner wall. The inner wall has a top end and a bottom end. The bottom end of the base protrudes downward and couples to a socket. The socket is configured for engaging by threading to a porcelain lamp holder. An outer wall enwraps the top end of the inner wall of the base. The outer wall has an outer surface and a top surface. A plurality of lights is positioned on the top surface of the outer wall. A level switch is positioned on the outer surface of the outer wall of the base. The level switch further includes a low button configured for emitting a yellow color from each of the lights, a high button configured for emitting a blue color from each of the lights, and a mid button configured for emitting a white color from each of the lights. A dome is positioned on the top surface of the outer wall. A solar panel is configured for providing power to the plurality of lights. The solar panel is in electric communication to the plurality of lights by a cord. The solar panel is configured for being positioned in sunlight. An outlet is positioned on the outer wall of the base. Additionally, a main switch is positioned on the outer surface of the outer wall of the base. The main switch comprises a plurality of buttons including a night button configured for enabling a photoelectric cell, an actuator button configured for closing or opening electric power from the solar panel to the plurality of lights, and a plus button configured for enabling a plurality of extra lights.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
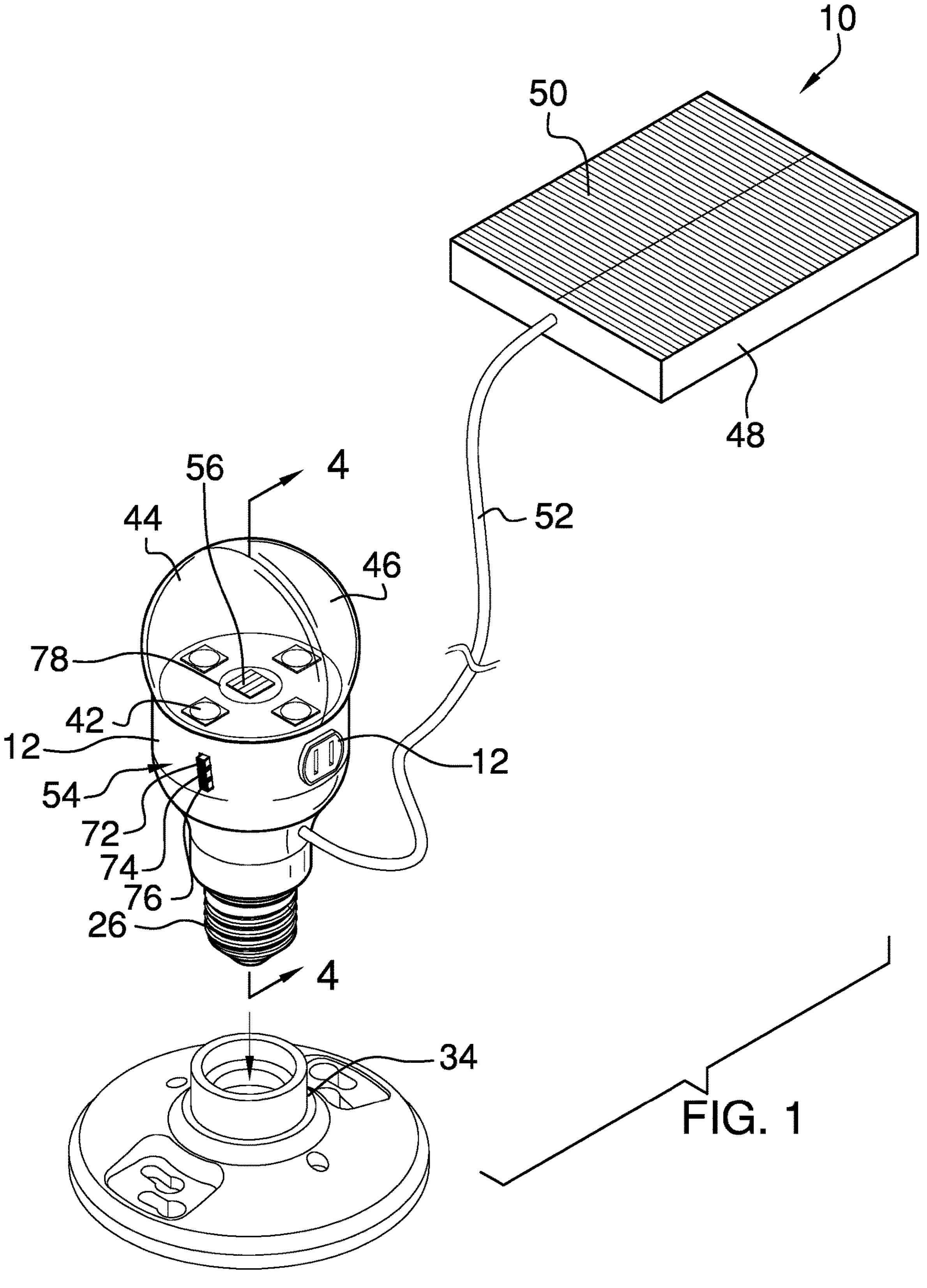
FIG. 1 is an isometric view of a solar powered lamp attachment assembly according to an embodiment of the disclosure.
Figure 2:
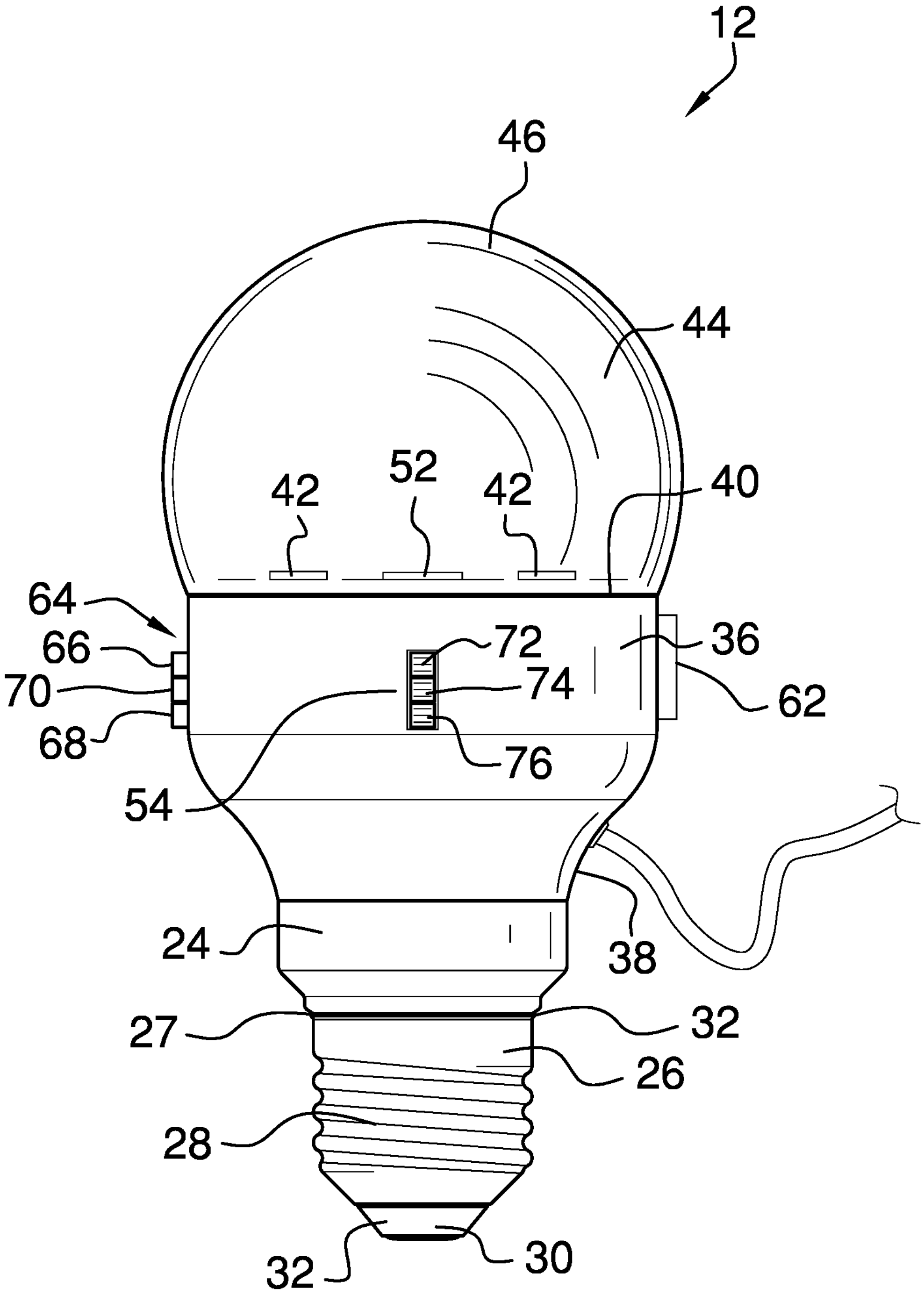
FIG. 2 is a front view of an embodiment of the disclosure.
Figure 3:
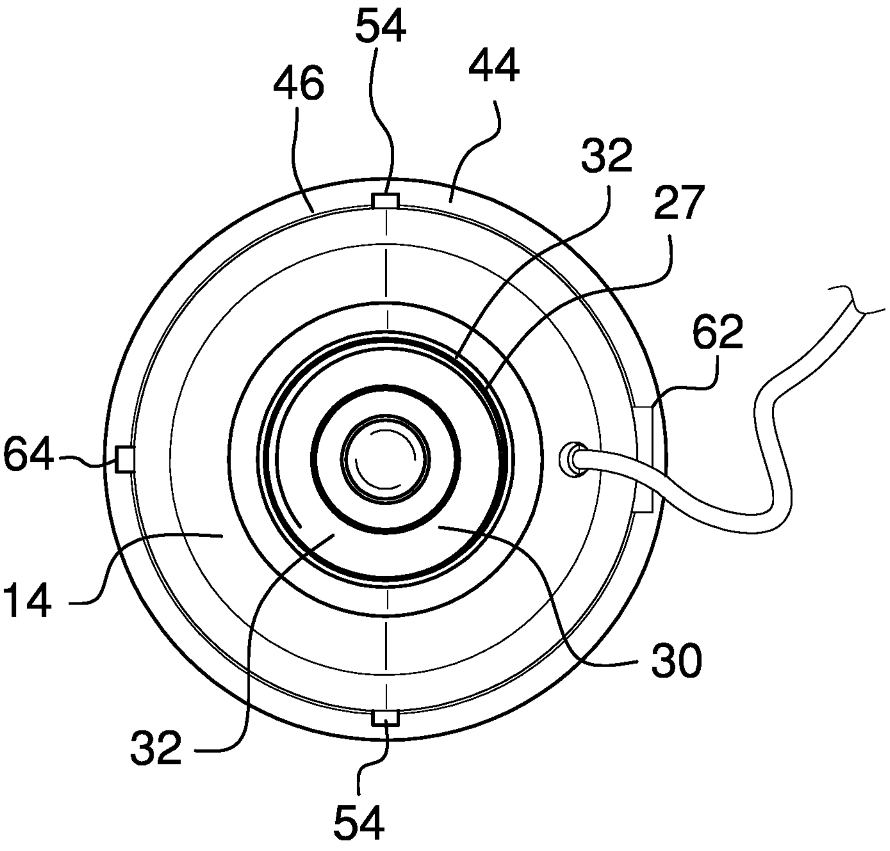
FIG. 3 is a bottom view of an embodiment of the disclosure.
Figure 4:
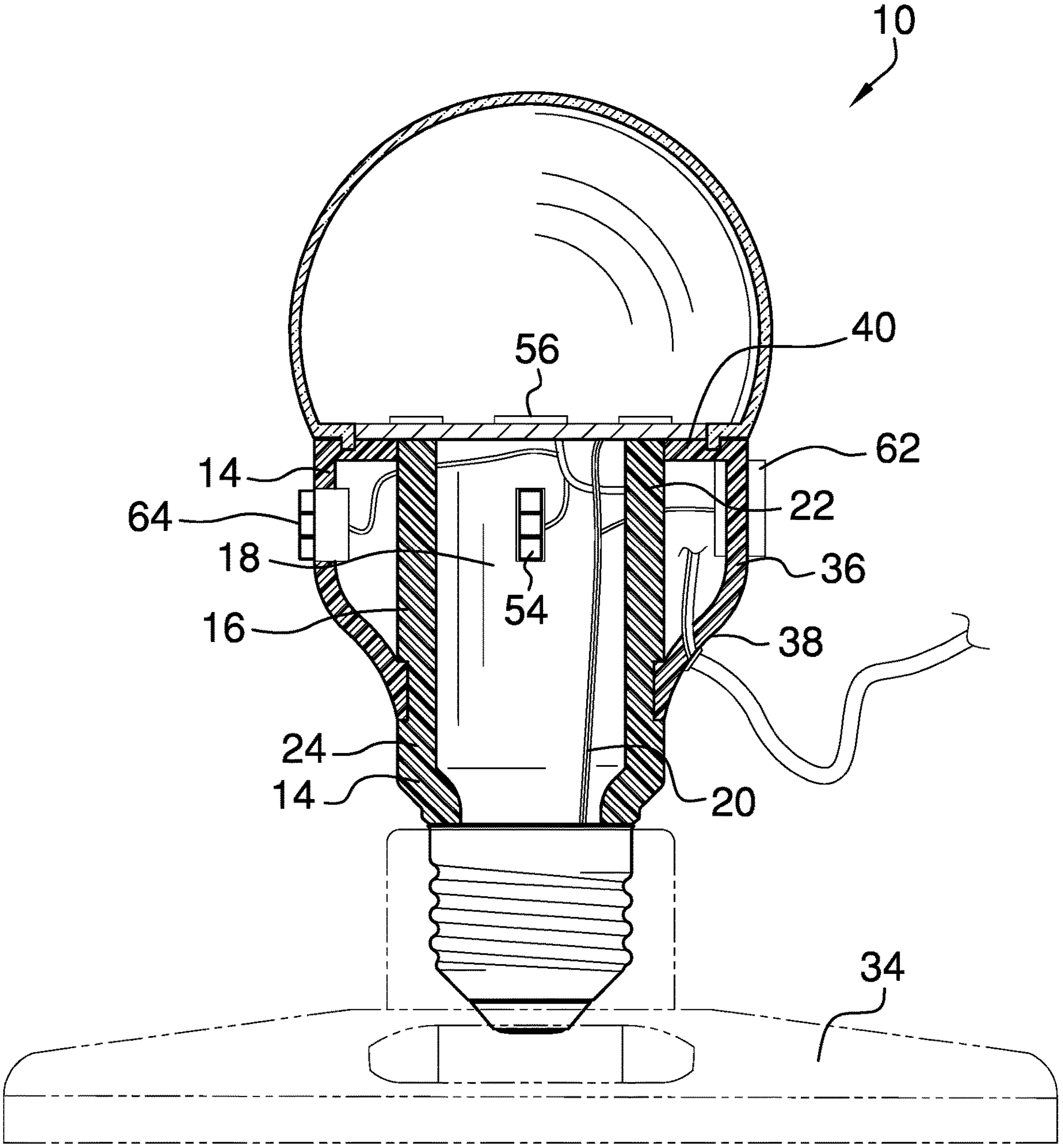
FIG. 4 is a cross-sectional view of an embodiment of the disclosure.
Figure 5:
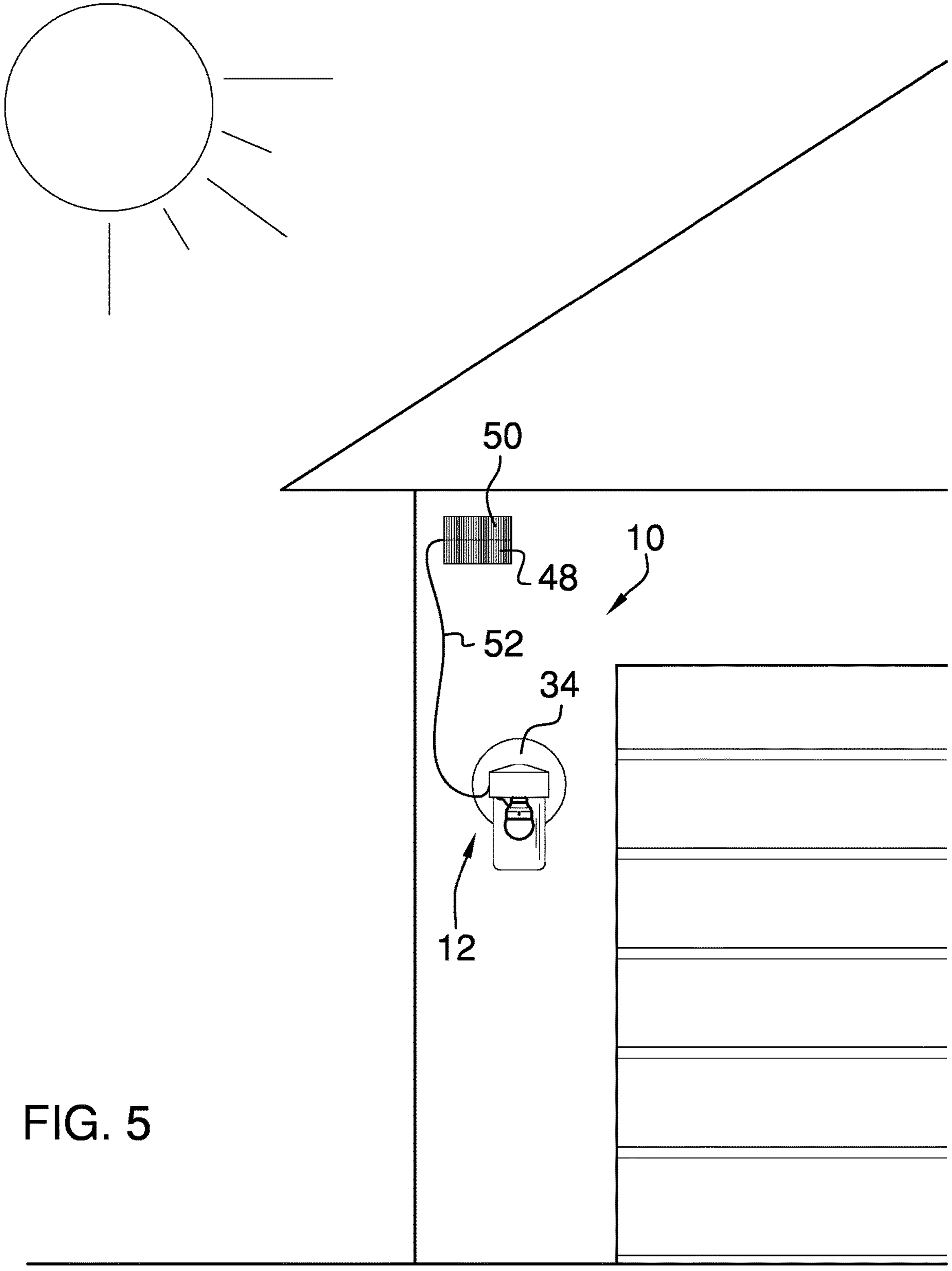
FIG. 5 is an in-use view of an embodiment of the disclosure.
Figure 6:
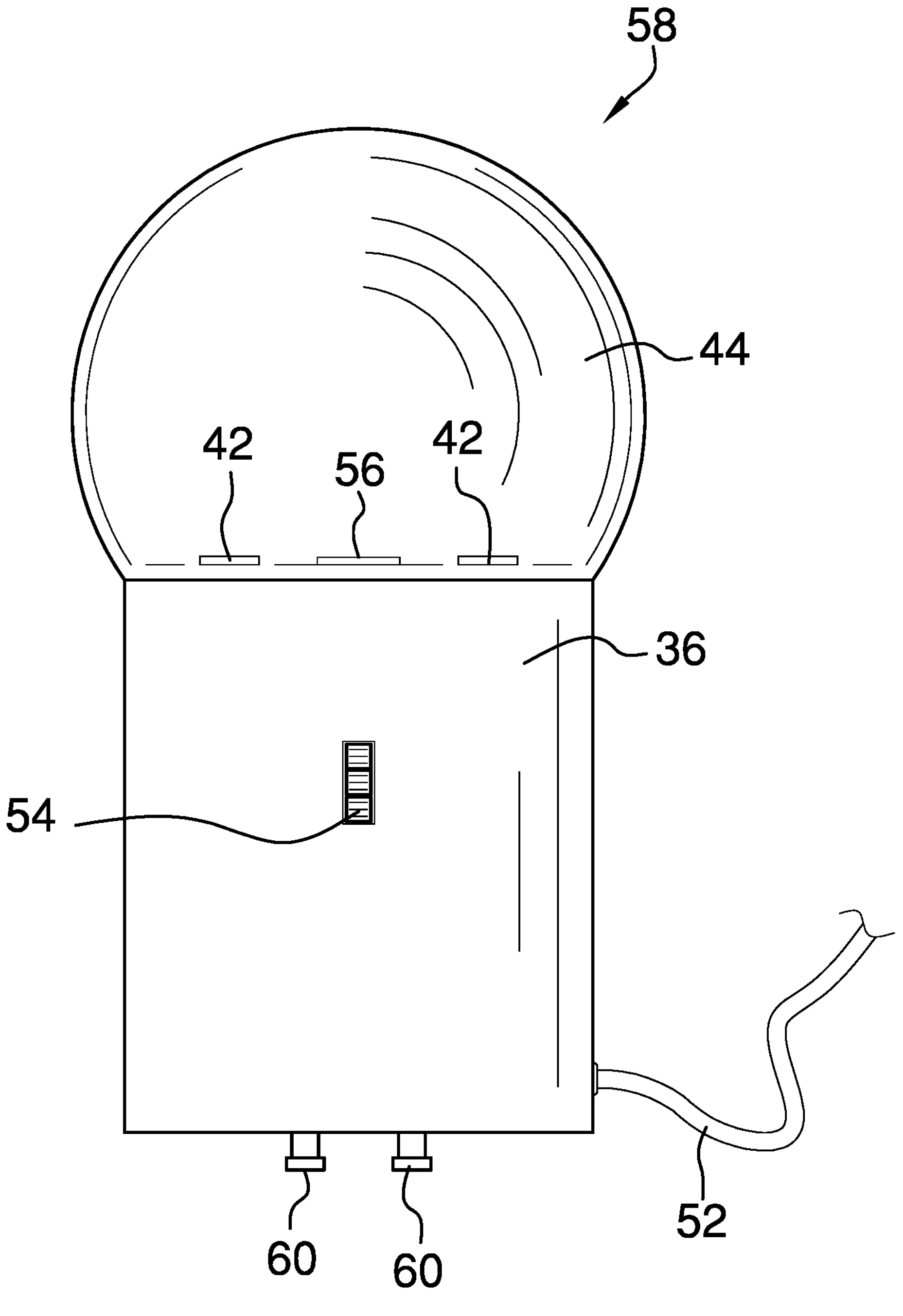
FIG. 6 is an alternative view of an embodiment of the disclosure.

With reference now to the drawings, and in particular to FIGS. 1 through 6 thereof, a new solar powered lamp device embodying the principles and concepts of an embodiment of the disclosure and generally designated by the reference numeral 10 will be described.

As best illustrated in FIGS. 1 through 6, the solar powered lamp attachment assembly 10 generally comprises a base 12 having a cylindrical shape. The base 12 is configured for being a plastic material 14. The plastic material 14 is configured for being resistant to damage by force. The base 12 has an inner wall 16 enclosing an interior 18. The interior 18 defines a space for an electric wire 20 to be positioned within. The inner wall 16 has a top end 22 and a bottom end 24. The bottom end 24 of the base 12 protrudes downward and couples to a socket 26. The socket 26 has an exterior male threading 28 and a tip 30 of the socket has is a metal material 32. Additionally, a ring 27 is positioned enwrapping the socket 26 and the ring 27 has the metal material 32 as well. The metal material 32 of the socket 26 and the ring 27 is in physical contact with the electric wire 20. The socket 26 is configured for engaging by threading to a porcelain lamp holder 34.

An outer wall 36 enwraps the top end 22 of the inner wall 16 of the base 12. The outer wall 36 is the plastic material 25 similar to the base 12. The outer wall 36 has an outer surface 38 and a top surface 40. The top surface 40 of the outer wall 36 is positioned perpendicular relative to the inner wall 16 of the base 12. Additionally, a plurality of lights 42 is positioned on the top surface 40 of the outer wall 36. Each of the lights 42 is in electric communication with the electric wire 20 of the interior 16 of the base 12. Each of the lights 42 is a light emitting diode configured for illuminating in a shaded or darkened environment. Furthermore, an outlet 62 is positioned on the outer wall 36 of the base 12. The outlet 62 is a female power plug output configured for providing electricity to a male power plug input. The outlet 62 is in electric communication with the ring 27 and the tip 30 of the socket 26.

A level switch 64 is positioned on the outer surface 38 of the outer wall 36 of the base 12. The level switch 64 is in electric communication with the plurality of lights 42. The level switch 64 is configured for altering the amount of electric power provided to each of the lights 42 wherein displaying a distinguish color. The level switch 64 further includes a low button 66. The low button 66 is configured for emitting a yellow color from each of the lights 42 such that the low button 66 reduces the amount of the electric power to each of the lights 42. A high button 68 is configured for emitting a blue color from each of the lights 42 such that the high button 68 increasing the amount of the electric power to each of the lights 42. A mid button 70 is configured for emitting a white color from each of the lights 42 such that the mid button 70 averages the amount of electric power from the low button 66 and the high button 68 to each of the lights 42.

A dome 44 is positioned on the top surface 40 of the outer wall 36. The dome 44 has a semi-sphere shape and the dome 44 is a translucent material 46. The dome 44 is configured for providing protection to the plurality of lights 42 from damage. The dome 44 is designed to resemble an already existing light bulb shape. In addition, the shape of the dome 44 expands the area of impact of the illumination of the plurality of lights 42 when each of the lights 42 receives power.

A solar panel 48 is configured for providing power to the plurality of lights 42. The solar panel 48 has a plurality of photo-voltaic cells 50 configured for absorbing sunlight to be used for electric power. The solar panel 48 is in electric communication with the plurality of lights 42 by a cord 52, wherein the solar panel 48 provides electric power to the plurality of lights 42. The cord 52 protrudes out from the outer surface 38 of the outer wall 36 of the base 12 into the solar panel 48. The solar panel 48 is configured for being positioned in sunlight, wherein the positioning of the solar panel 48 can either be distal or proximal relative to the porcelain lamp holder 34.

A main switch 54 is positioned on the outer surface 38 of the outer wall 36 of the base 12. The main switch 54 comprises a plurality of buttons. The main switch 54 further includes a night button 72 configured for enabling a photoelectric cell 56. The photoelectric cell 56 is configured for reducing or increasing electric power provided to the plurality of lights 42 from the solar panel 48. An actuator button 74 is configured for closing or opening electric power from the solar panel 48 to the plurality of lights 42. The actuator button 74 is positioned adjacent to the night button 72. A plus button 76 of the main switch 54 is configured for enabling a plurality of extra lights 78. The plurality of extra lights 78 is in electric communication with the solar panel 48. The plurality of extra lights 78 is positioned in the dome 44 and is configured for providing enhanced lighting to the plurality of lights 42.

An alternative embodiment 58 of the solar powered lamp device 10 includes the outer wall 36 of the base 12 enwrapping both the top end 22 and the bottom end 24 of the base 12. Furthermore, the socket 26 of the base 12 is replaced by a pair of contacts 60 configured for securing to an electric power supply. The alternative embodiment 58 would include the plurality of lights 42, the dome 44, the switch 54, and the solar panel 48.

In use, the socket 26 of the base 12 is engaged by threading with a porcelain lamp holder 34. The solar panel 48 is positioned in an area to receive sunlight to provide electric power to the plurality of lights 42. The plurality of lights 42 can change their color and level of power use by engaging with the level switch 64. The night button 72 of the main switch 54 can be engaged with to actuate the photoelectric cell 56 wherein enabling the plurality of lights 42 to emit light during night. Furthermore, the plurality of lights 42 can receive electric power from the porcelain lamp holder 34 if the user decides to enable electric current to the porcelain lamp holder 34. The user can engage the plurality of extra lights 78 to emit more light during times of less sunlight, such as winter time.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A solar powered light bulb device configured for reducing energy consumption, the solar powered light bulb device comprising:

a base having a cylindrical shape, said base having an inner wall, said inner wall having a top end and a bottom end, said bottom end of said inner wall protruding downward and coupling to a socket, said socket configured to threadably engage a porcelain lamp holder;

an outer wall enwrapping said top end of said inner wall of said base, said outer wall having an outer surface, said outer wall having a top surface;

a plurality of lights being positioned on said top surface of said outer wall;

a level switch positioned on said outer surface of said outer wall of said base, said level switch further including:

a low button, said low button configured to control each of said plurality of lights to emit a yellow color;

a high button, said high button configured to control each of said plurality of lights to emit a blue color; and a mid button configured to control each of said plurality of lights to emit a white color;

a dome positioned on said top surface of said outer wall;

a solar panel configured to provide power to said plurality of lights, said solar panel is in electric communication with said plurality of lights by a cord, said solar panel is configured for being positioned in sunlight separate from said base via the cord;

an outlet positioned on said outer wall of said base; and a main switch positioned on said outer surface of said outer wall of said base, said main switch comprising a plurality of buttons, said main switch further including:

a night button configured to enable a photoelectric cell;

an actuator button configured to close or open electric power from said solar panel to said plurality of lights; and a plus button configured to enable a plurality of extra lights positioned on said top surface of said outer wall and separate from said plurality of lights.

2. The solar powered light bulb device of claim 1, wherein said base comprises a plastic material.

3. The solar powered light bulb device of claim 1, wherein said inner wall encloses an interior, said interior defining a space for an electric wire to be positioned.

4. The solar powered light bulb device of claim 3, wherein said socket has an exterior male threading, wherein a ring enwraps said socket, said ring and a tip of said socket comprise a metal material, said metal material is in physical contact with said electric wire.

5. The solar powered light bulb device of claim 2, wherein said outer wall comprises said plastic material.

6. The solar powered light bulb device of claim 5, wherein said top surface of said outer wall is positioned perpendicular to said inner wall of said base.

7. The solar powered light bulb device of claim 4, wherein each of said plurality of lights is in electric communication with said electric wire, and each of said plurality of lights is a light emitting diode.

8. The solar powered light bulb device of claim 7, wherein said level switch is in electric communication with said plurality of lights, said level switch is configured to alter the amount of electric power provided to each of said plurality of lights in order to change the color of light displayed by said plurality of lights.

9. The solar powered light bulb device of claim 8, wherein said low button reduces an amount of said electric power to each of said plurality of lights, such that each of said plurality of lights produces the yellow color.

10. The solar powered light bulb device of claim 9, wherein said high button increases said amount of said electric power to each of said plurality of lights, such that each of the plurality of lights produces the blue color.

11. The solar powered light bulb device of claim 10, wherein said mid button averages said amount of electric power from said low button and said high button to each of said plurality of lights, such that each of the plurality of lights produces the white color.

12. The solar powered light bulb device of claim 5, wherein said dome comprises a semi-sphere shape, said dome is formed of a translucent material, said dome is configured to provide protection to said plurality of lights from damage.

13. The solar powered light bulb device of claim 11, wherein said solar panel comprises a plurality of photovoltaic cells configured for absorbing sunlight to be used for electric power.

14. The solar powered light bulb device of claim 13, wherein said cord extends out from said outer surface of said outer wall of said base and into said solar panel.

15. The solar powered light bulb device of claim 14, wherein said outlet is a female power plug output, said outlet configured for providing electricity to a male power plug input, said outlet in electric communication with said ring and said tip of said socket.

16. The solar powered light bulb device of claim 15, wherein said photoelectric cell is configured for reducing or increasing electric power provided to said plurality of lights from said solar panel.

17. The solar powered light bulb device of claim 16, wherein said actuator button is positioned adjacent to said night button.

18. The solar powered light bulb device of claim 17, wherein said plurality of extra lights is in electric communication with said solar panel, said plurality of extra lights is positioned in said dome.

19. A solar powered light bulb device configured for reducing energy consumption, the solar powered light bulb device comprising:

a base having a cylindrical shape, said base comprising a plastic material, said base having an inner wall, said inner wall enclosing an interior, said interior defining a space for an electric wire to be positioned within, said inner wall having a top end and a bottom end, said bottom end of said inner wall protruding downward and coupling to a socket, said socket having an exterior male threading, a ring enwrapping said socket, said ring and a tip of said socket comprising a metal material, said metal material is in physical contact with said electric wire, said socket is configured to threadably engage a porcelain lamp holder;

an outer wall enwrapping said top end of said inner wall of said base, said outer wall comprising said plastic material, said outer wall having an outer surface, said outer wall having a top surface, said top surface of said outer wall positioned perpendicular to said inner wall of said base;

a plurality of lights positioned on said top surface of said outer wall, each of said plurality of lights is in electric communication with said electric wire, each of said plurality of lights is a light emitting diode;

a level switch positioned on said outer surface of said outer wall of said base, said level switch is in electric communication with said plurality of lights, said level switch is configured for altering the amount of electric power provided to each of said plurality of lights in order to alter the color of light displayed by said plurality of lights, said level switch further including:

a low button, said low button configured to control each of said plurality of lights to emit a yellow color, said low button reducing an amount of said electric power to each of said lights;

a high button configured to control each of said plurality of lights to emit a blue color, said high button increasing said amount of said electric power to each of said plurality of lights; and a mid button configured to control each of said plurality of lights to emit a white color, said mid button averaging said amount of electric power from said low button and said high button to each of said lights;

a dome positioned on said top surface of said outer wall, said dome having a semi-sphere shape, said dome comprising a translucent material, said dome being configured to protect said plurality of lights from damage;

a solar panel configured to provide power to said plurality of lights, said solar panel having a plurality of photovoltaic cells configured for absorbing sunlight to be used for electric power, said solar panel is in electric communication with said plurality of lights by a cord, said cord extends out from said outer surface of said outer wall of said base and into said solar panel, said solar panel is configured to be positioned in sunlight at a distance from the base via the cord;

an outlet positioned on said outer wall of said base, said outlet is a female power plug output, said outlet is configured for providing electricity to a male power plug input, said outlet is in electric communication with said ring and said tip of said socket; and a main switch positioned on said outer surface of said outer wall of said base, said main switch comprising a plurality of buttons, said main switch further including:

a night button configured to enable a photoelectric cell, said photoelectric cell configured for reducing or increasing electric power provided to said plurality of lights from said solar panel;

an actuator button configured for closing or opening electric power from said solar panel to said plurality of lights, said actuator button positioned adjacent to said night button; and a plus button configured to enable a plurality of extra lights, said plurality of extra lights being in electric communication with said solar panel, said plurality of extra lights is positioned in said dome.

* * * * *